United States Patent [19]

Sakaguchi

[11] Patent Number: 6,064,468
[45] Date of Patent: May 16, 2000

[54] LIGHT SOURCE POSITION ADJUSTING DEVICE AND METHOD

[75] Inventor: Yasunobu Sakaguchi, Kanagawa, Japan

[73] Assignee: Fuji Photo Film Co., Ltd., Kanagawa, Japan

[21] Appl. No.: 09/006,205

[22] Filed: Jan. 13, 1998

[30] Foreign Application Priority Data

Jan. 13, 1997 [JP] Japan ..................................... 9-003782

[51] Int. Cl.[7] .......................... G03B 27/54; G03B 27/72
[52] U.S. Cl. ............................................... 355/67; 355/35
[58] Field of Search .................................. 355/67, 30, 35, 355/68, 38, 41; 250/201.2, 201.3, 204, 559.02, 234; 358/474, 298, 506, 302, 494; 348/96, 97, 98

[56] References Cited

U.S. PATENT DOCUMENTS

| | | | |
|---|---|---|---|
| 4,174,173 | 11/1979 | Pone', Jr. ...................................... | 355/38 |
| 5,005,040 | 4/1991 | Norita et al. ........................... | 250/201.2 |
| 5,726,739 | 3/1998 | Hayata ........................................ | 355/67 |
| 5,744,795 | 4/1998 | Bianchi et al. .......................... | 250/234 |
| 5,796,466 | 8/1998 | Choi .......................................... | 355/35 |

*Primary Examiner*—Alan A. Mathews
*Assistant Examiner*—Peter B. Kim

[57] ABSTRACT

A light source position adjusting method and system are used for an image input apparatus including a light source for irradiating film original. A light source moving device is operable from the outside of the external cover of the image input apparatus. A position of the light source is adjusted from the outside of the external cover using a measuring tool so that the quantities of light are uniformly balanced at a plurality of measuring points on the plane of the film original. The measuring tool is thereafter removed. The average value of the output values in the specific pixel regions of the image sensor corresponding to the plurality of measuring points on the plane of the film original are determined and the balance output values of the respective pixel regions are stored. The position of the light source is adjusted so that the output values of the image of the light source are made equal or closer to the balanced output values stored.

17 Claims, 7 Drawing Sheets

LIGHT SOURCE POSITION ADJUSTING DEVICE AND METHOD

BACKGROUND OF THE INVENTION

The present invention relates to a light source position adjusting method capable of adjusting the position of a light source which is used in an image input apparatus for two-dimensionally reading an image born by a film original using an image sensor by subjecting the light source to shading correction using an output value obtained by reading the image projected from the light source irradiating the film original by the image sensor while putting on the light source so that the quantity of light irradiated onto the film original is uniformly balanced.

Images recorded on photographic film originals such as a negative film, a reversal film and the like are conventionally printed onto light-sensitive materials such as photographic papers and the like by so-called direct exposure. That is, a method in which an image born by an original film is projected onto the light-sensitive material for area exposure.

In contrast, recently under development are apparatuses making use of digital exposure, that is, digital photoprinters which photoelectrically read image information recorded on a film original, convert the thus read image into a digital signal and thereafter apply various steps of image processing to the digital signal to thereby provide recording image information. The image (latent image) is then recorded on a light-sensitive material by scan exposing it with recording light which is modulated in accordance with the image information, and a print is produced through development.

The digital photoprinter can freely perform editing and layout jobs for print images such as composition of a plurality of images to a composite image, division of a single image into segments, editing of characters and images and the like. Further, it can perform various types of image processing such as color/density adjustments, magnification adjustments, edge enhancement and the like and output prints which are freely subjected to editing and image processing in accordance with a specific use. Although conventional print systems employing the direct exposure cannot reproduce the entire image recorded on a film in such aspects as density resolution, color/density reproducibility and the like, the digital photoprinter can output a print in which the image recorded on the film is almost perfectly reproduced.

Further, since the digital photoprinter can record (store) the image information of the images recorded on respective films and image processing conditions to the image information to a memory device provided with the system and an external memory device such as a floppy disc and the like, there is an advantage that extra printing and other jobs can be accomplished without any films serving as originals. What is more, extra printing and other jobs can be performed in a rapid and efficient manner because processing conditions need not be set again.

Essentially, the digital photoprinter is composed of an image input apparatus for reading the image recorded on an original such as a film and the like, a set-up device for determining exposing conditions used when the read image is recorded by being subjected to image processing and an image recording device or scan exposing a light-sensitive material in accordance with the thus determined exposing conditions and subjecting it to development processing.

In the image input apparatus used in the digital photoprinter, reading light is irradiated to a film as an original so as to obtain projection light which bears the original image and the projection light is then projected onto an image sensor such as a CCD or the like to thereby read the original image photoelectrically. The thus read original image information (image data signal) is subjected to proper image processing and exposed and a light-sensitive material is subjected to exposure, printing, development and the like based on the original image information so that a hard copy on which the film original bearing image is reproduced can be obtained.

To obtain an output image (finished print) having good image quality, the image must be reproduced with properly balanced color and density. For this purpose, the image input apparatus must read the image in such a manner that the color and density thereof are kept in good balance. However, since the illuminance of the light emitted from the filament of a light source is generally varied, there is used diffused light which is diffused using a diffusing device such as a diffusion plate, a diffusion box or the like or an image data signal read from a film original by an image sensor or the like is subjected shading correction electrically or by software using the data signal of the image projected from a light source when no film original is loaded.

However, when it is desired to obtain an image of higher quality, there is a problem that even if the light obtained by diffusing light emitted from a light source by a diffusing device is used and an obtained image data signal is subjected to shading correction, the shading correction cannot be sufficiently performed. Although it is contemplated to perfectly diffuse the light emitted from the light source by the diffusing device, since the light must be caused to pass through many diffusion plates and irregularly reflected many times for the perfect diffusion, a problem arises in that an intensity of light necessary to read an image cannot be obtained because it is lowered in the above processes.

Further, there is a variation of the positions of the filaments of lamps with respect to the inserting pins of the lamps to the sockets of light sources, for example, the mounting legs of the lamps which are inserted into the sockets of the light sources and the variation is different among the individual lamps. As a result, the center of an optical axis set from the mounting port of a socket is dislocated from the center of the filament of a lamp, by which the quantity of light of the light source is shaded. Since the shading is different among respective light sources, when an image input apparatus to which very high image quality is required is used, the shading resulting from the variation of filament positions must be also corrected.

To deal with the above problems, when a lamp is mounted or replaced, it must be repeatedly performed such a procedure to a plurality of light source positions that the lamp is put on after it is mounted on a socket, a light source image is read by an image sensor through a lens unit and a best light source position is determined by comparing the thus obtained shading states of the light source images with each other. However, there is a problem that the repetition of the above job takes a long time when the cooling of the lamp and the like is taken into consideration and the job is very troublesome. In addition, since the light source used in the above image input apparatus requires a high intensity of light, a current of about 10 A flows to the filament, a large quantity of heat is generated and the temperature of the light source increases to about 100° C.

Although the external cover of the image input apparatus is of course removed when the light source is mounted or replaced, there is a problem that it is dangerous to adjust the light source position by putting on the lamp for shading correction in the state that the exterior cover is removed, whereas it is troublesome to put off and cool the lamp and open and close the exterior cover each time the light source position is moved.

Although there is a regulation that the temperature of the exterior cover must be 60° C. or less when it is composed of metal or 85° C. or less when it is composed of resin to ensure that the user can safely perform a job in the vicinity of the external cover, since the temperature of the light source is increased to about 100° C. when it is put on, a problem arises in that the regulation may not be satisfied when the exterior cover is located near to the light source.

Even if an optimum light source position where the output value from an image sensor is made uniform is determined by reading the shading state of a light source image by the image sensor by adjusting the light source position while repeatedly putting on and off the lamp of the light source as described above, if a variation is made to image sensors such as, for example, CCDs and the like when they are manufactured and the sensitivities of the CCDs themselves are varied (the variation of the sensitivities due to position), that is, the CCDs are shaded, there is a problem that the quantity of light irradiated onto the plane of a film original by the lamp of the light source is not made uniform and the shading of the light source itself is not accurately corrected.

SUMMARY OF THE INVENTION

An object of the present invention for solving the above problems of prior art is to provide a light source position adjusting method by which when the image projected from a light source used to an image input apparatus and the like is read by an image sensor in the state that the light source is put on, the position of the light source can be safely and simply adjusted from the outside of the exterior cover of the image input apparatus to perform shading correction while displaying the balanced state of the quantity of light on the plane of a film original which is affected by the positional displacement of the filament of the light source on a display unit such as a CRT or the like.

Another object of the present invention is to provide a light source position adjusting method by which the position of a light source can be safely adjusted by causing the temperature of an exterior cover to satisfy a regulation even if the light source is put on or lowering the temperature of the exterior cover to a degree which is not felt hot even if the user touches it.

To achieve the above objects, the present invention provides a light source position adjusting method executed by an image input apparatus comprising a light source device including a light source for irradiating a film original and a light source moving device for two-dimensionally and finely adjusting the position of the light source, a lens unit for adjusting the focus of the light beam which is emitted from the light source, passes through the film original and bears the image of the film original, an image sensor for photo-electrically reading the image of the film original focused by the lens unit, image processing means for processing the image information read by the image sensor and a monitor for displaying the result of processing executed by the image processing means, comprising the steps of arranging the light source moving device operable from the outside of the external cover of the image input apparatus; two-dimensionally adjusting a position of the light source by putting on the light source and previously operating the light source moving device from the outside of the external cover using a measuring tool without operating the film original so that the quantities of light are uniformly balanced at a plurality of measuring points on the plane of the film original; removing the measuring tool thereafter, reading the image of the light source projected by the lens unit by the image sensor, determining the average value of the output values in the specific pixel regions of the image sensor corresponding to the plurality of measuring points on the plane of the film original and storing the balanced output values of the respective pixel regions; and two-dimensionally adjusting the position of the light source by operating the light source moving device from the outside of the external cover so that the output values of the image of the light source which are output from the respective pixel regions corresponding to the plurality of measuring points are made equal or closer to the balanced output values stored, the image of the light source being projected by the light beam which is emitted from the light source, passes through the lens unit and is read by the image sensor.

It is preferable that the balanced state of the prestored output values of the respective pixel regions of the image sensor corresponding to the plurality of measuring points, and the balanced state of the adjusted output values are displayed on the monitor, and the position of the light source is adjusted while observing the balanced states of these output values displayed on the monitor.

It is preferable that the plurality of measuring points are at least three points at the specific positions in the vicinities of the four corners of the plane of the film original with respect to the center thereof.

Further, it is also preferable that the monitor displays adjustment permissible ranges which permit the balanced state in one direction of the four corners of the plane of the film original and the balanced state in the direction perpendicular to the one direction to be obtained from the balanced state of the prestored output values and the adjusting positions, the adjusting directions and the completion of adjustment of the light source moving device can be confirmed.

DESCRIPTION OF THE PREFERRED EMBODIMENT

A light source position adjusting method according to the present invention will be described below in detail based on a preferred embodiment shown in the accompanying drawings.

Figure 1:
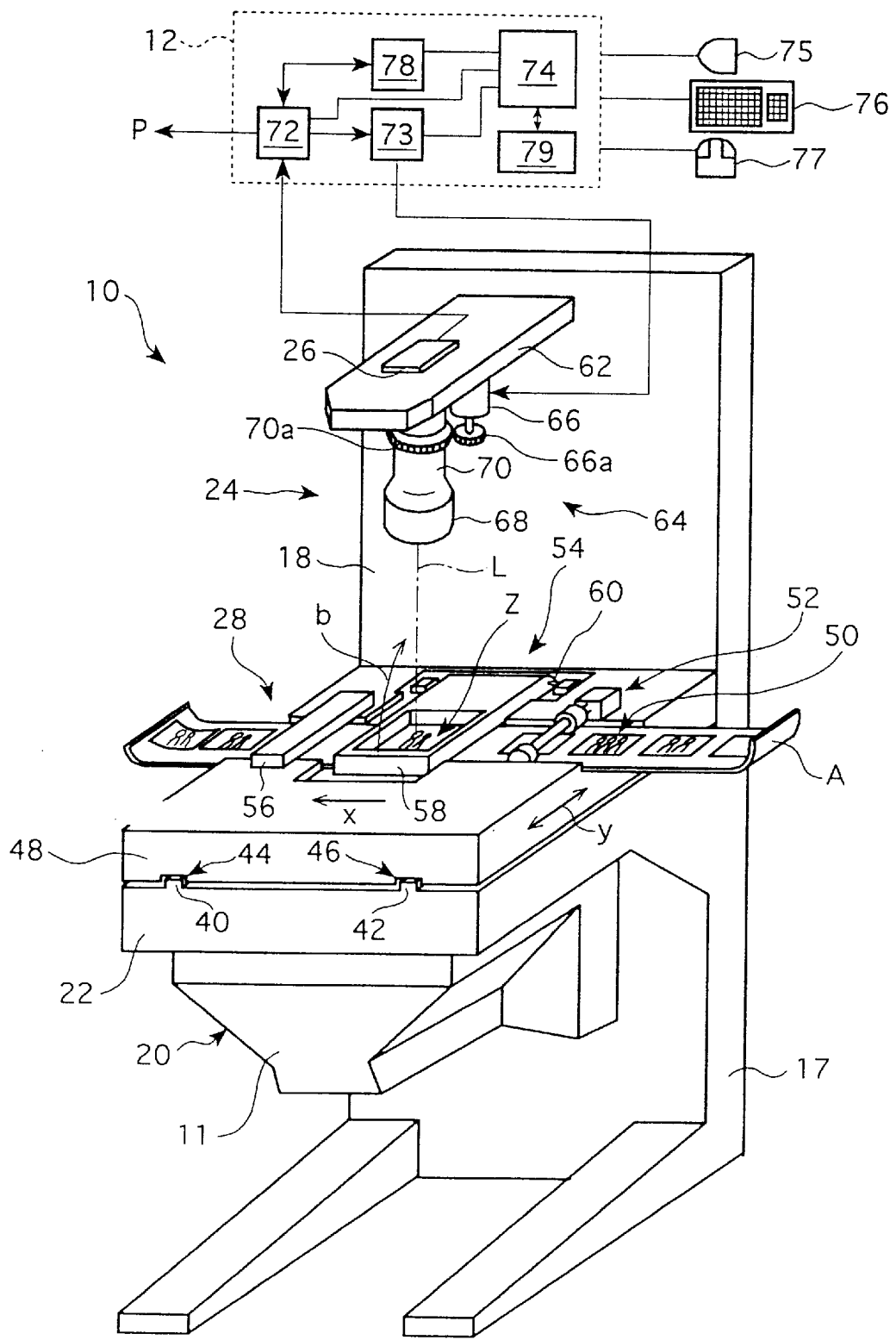
FIG. 1 is a schematic perspective view of an embodiment of an image input apparatus embodying a light source position adjusting method according to the present invention.

FIG. 1 shows a schematic perspective view of an embodiment of an image input apparatus embodying the light source position adjusting method of the present invention.

An image input apparatus (hereinafter, referred to as an input device) 10 shown in FIG. 1 is a device which uses various types of film originals such as a strip A as an elongated negative or reversal film on which a lot of images are recorded or, a slide composed of a single film (ordinarily, reversal film) fixed to a frame (mount) and the like. It photoelectrically reads original images recorded on these original films and is used to the aforesaid digital photoprinter.

The input device 10 is essentially composed of an optical frame 18 having a leg 17, a light source section 20 on which a light source device 14 is mounted, a carrier base 22, an imaging unit 24, an image sensor 26 as an area sensor, a controller 12 for processing the signal output from the image sensor 26 and supplying it to a recording device P or the like as image information and operating and controlling the input device 10 (or digital photoprinter) as a whole and carriers such as, for example, a film carrier and a slide carrier which correspond to various types of originals and are mounted on and dismounted from the carrier base 22. The illustrated example of the input device 10 in FIG. 1 shows a state that a film carrier 28 is mounted thereon to feed the strip A in its longitudinal direction so that the original images recorded thereof are sequentially fed to a specific reading position Z.

In the image input apparatus 10 of the illustrated example, the strip A is fed in an x-direction in the drawing by the film carrier 28 mounted on the carrier base 22 and stopped at the reading position Z, reading light from the light source section 20 is irradiated to the strip A to thereby obtain projection light bearing the original images, and the projection light is projected onto the image sensor 26 by the imaging unit 24 and supplied to the controller 12 by being subjected to photoelectrical conversion. In the controller 12, the signal supplied from the image sensor 26 is subjected to image processing and the original images recorded on the film strip A are two-dimensionally read. Since the input device 10 two-dimensionally (facially) reads the images of the film original by employing the area image sensor as the image sensor 26, a time necessary to read the images is greatly reduced as compared with the time required when the images are read by conventional scan exposure, so that a print production efficiency can be greatly enhanced.

The light source section 20 which irradiates the reading light to the strip A (film original) and obtains the projection light bearing the original images is located below the carrier base 22 on the upper portion of the leg 17 of the optical frame 18 and has an exterior cover 11 which is disposed on the front surface thereof and opens the interior of the light source section 20 to permit the light source (lamp) of the light source device 14 to be mounted or replaced.

Figure 2:
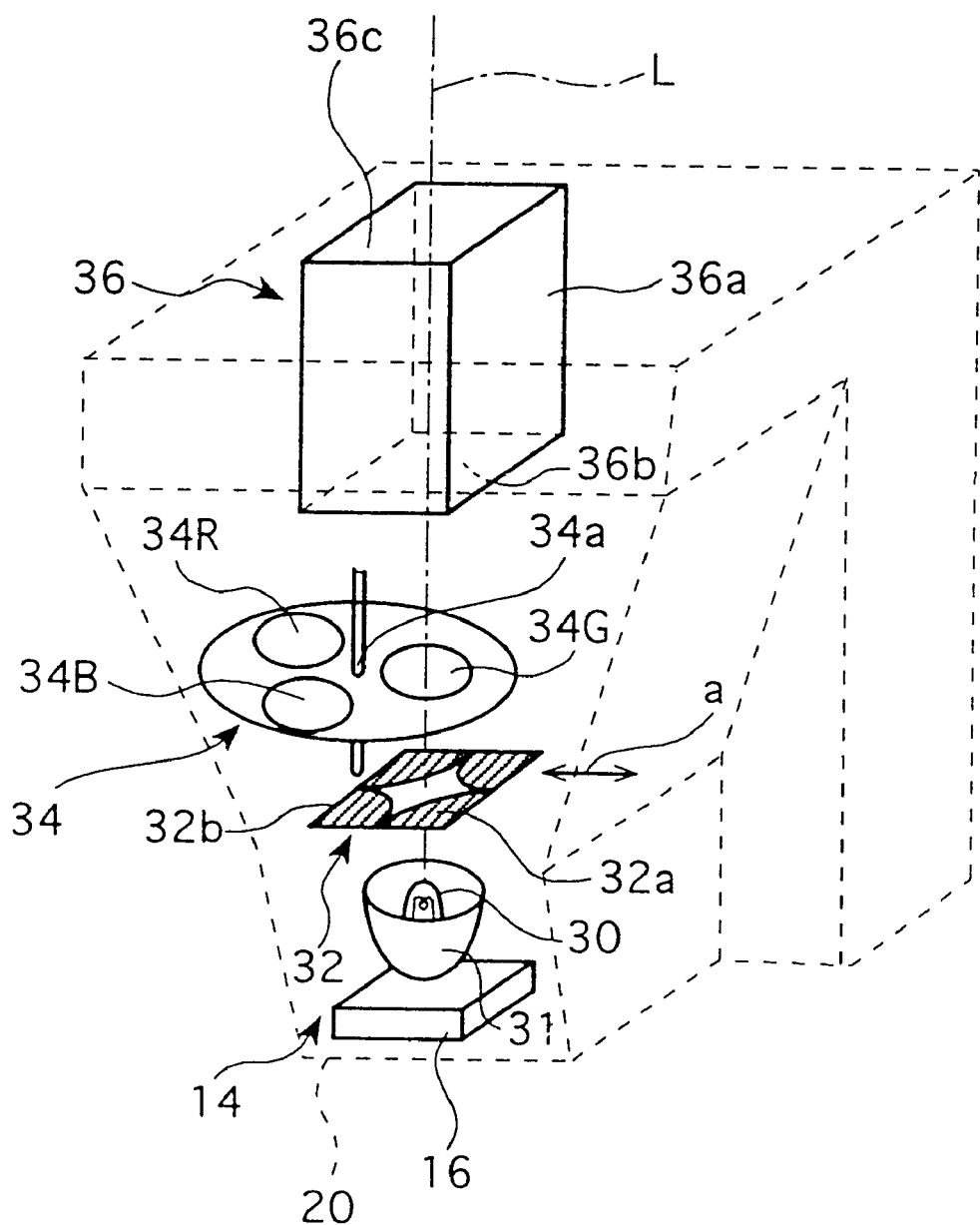
FIG. 2 is a schematic perspective view of an embodiment of the arrangement of a light source section of the image input apparatus shown in FIG. 1.

FIG. 2 shows a schematic view of the interior of the light source section 20. The light source section 20 includes a light source device 14 having a light source 30, a reflector 31 for reflecting the light from the light source 30 and a light source moving unit 16 for adjusting the position of the light source 30, a variable stop 32, a color filter plate 34 and a diffusion box 36.

The light source section 20 is further provided, in addition to the above components, with a cooling fan 38 (refer to FIG. 6) for cooling various components such as the light source 30 and the like and a shutter (not shown) for shielding the reading light emitted from the light source section 20 onto the strip A if necessary when the color filter plate 34 to be described later is changed, and the like.

As the light source 30 used in the light source device 14, various known light sources such as, for example, a halogen lamp, a xenon lamp, a mercury vapor lamp and the like which can emit a quantity of light sufficient for the image sensor 26 to read an image can be utilized. The reflector 31 is composed of a known reflector for obtaining a sufficient quantity of light by reflecting the light from the light source 30 in a specific direction. The light source 30 (reflector 31) is supported by the light source moving unit 16 having an x-y stage or the like and arranged such that the position thereof can be adjusted within the plane of the strip A from the outside of the exterior cover 11. Note, the light source moving unit 16 constituting the light source device 14 will be described later.

The variable stop 32 is disposed downstream of the light source 30 in the direction of an optical axis L (hereinafter, referred to as upward) to adjust the quantity of reading light incident on the strip A. The variable stop 32 is composed of two ND filters 32a and 32b each having a logarithm-curved shielding portion which has a different quantity of passing light in the direction of arrow a perpendicular to the optical axis L depending upon the position where the filter is located, and the quantity of light from the light source 30 to the strip A is adjusted in a range, for example, from a totally open state (no quantity of light is reduced) to a shielded state by causing the ND filters to come closer to or depart from each other.

The color filter plate 34 is composed of a disc-shaped member having three color filters, namely, an R (red) filter 34R, a G (green) filer 34G and a B (blue) filter 34B and can be turned about a shaft 34a by a rotation device such as a motor (not shown) or the like which is engaged with the shaft 34a. In the light source section 20, the R filter 34R, the G filer 34G and the B filter 34B are sequentially inserted into the light passage L by the rotation of the color filter plate 34 so that the original images recorded on the film is sequentially read by being decomposed into the three primary colors by the additive color process of an R-image, a G-image and a B-image. That is, the input device 10 reads the original images recorded on the strip A by reading the images three times.

The diffusion box 36 is used to diffuse the reading light which was emitted from the light source 30 and passed through the color filter with the quantity thereof adjusted by the variable stop 32 so that the quantity and other features of the reading light incident on the film is made uniform in a film plane direction, namely, on a plane perpendicular to the optical axis L. The diffusion box 36 may be composed of, for example, a quadrangular prism 36a having internal specular surfaces and open upper and lower surfaces with a ground glass 36b disposed on the lower surface and an milky acrylic sheet 36c disposed on the upper surface, respectively. Note, a known diffusion plate such as an opal glass plate or the like may be used in place of the diffusion box 36. In addition, the diffusion box 36 need not be disposed as shown in the illustrated example and may be disposed downward of the color filter plate 34 and the variable stop 32.

Figure 3:
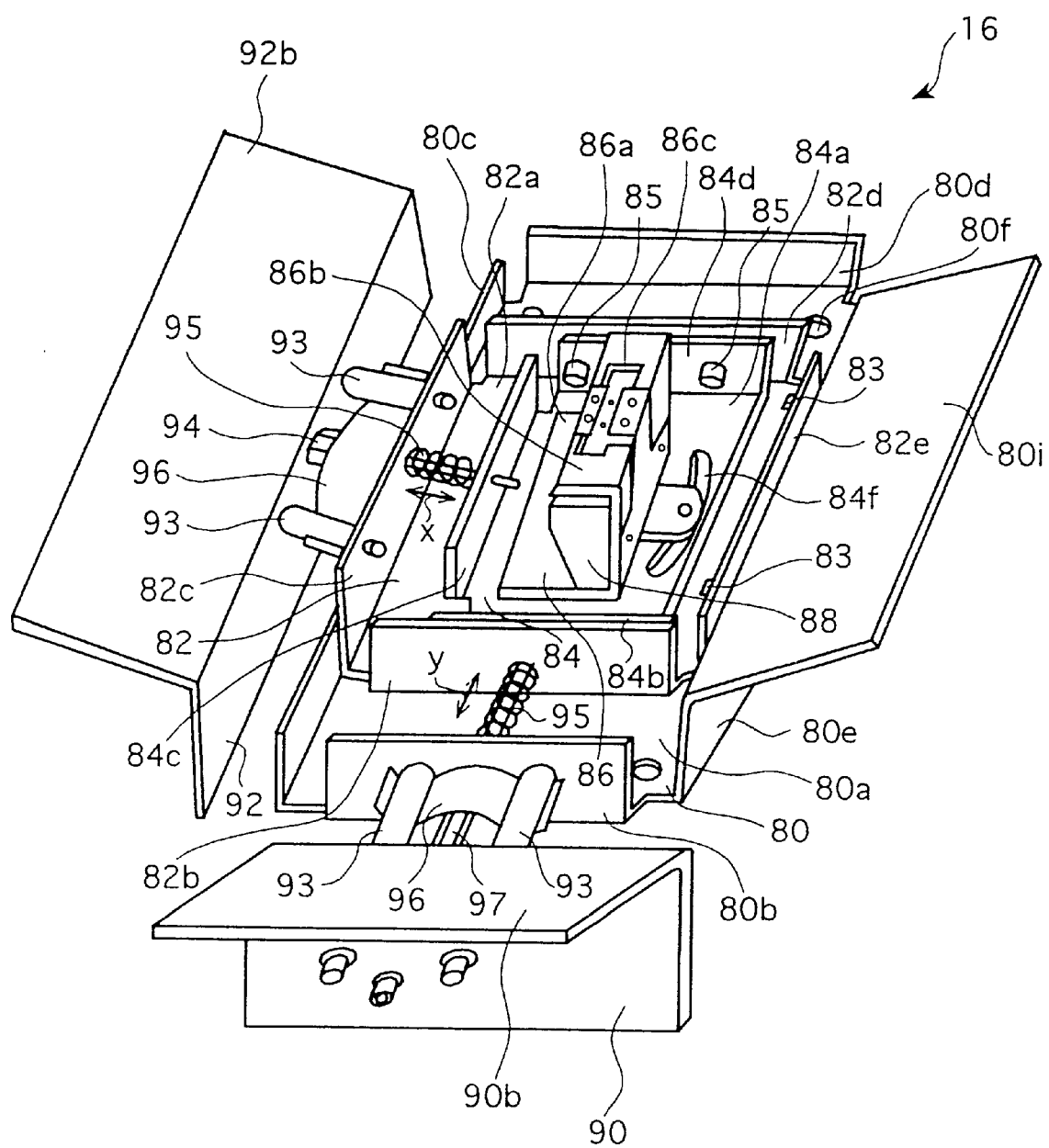
FIG. 3 is a perspective view of an embodiment of a light source moving unit of a light source device applied to the light source unit shown in FIG. 2.
Figure 4:
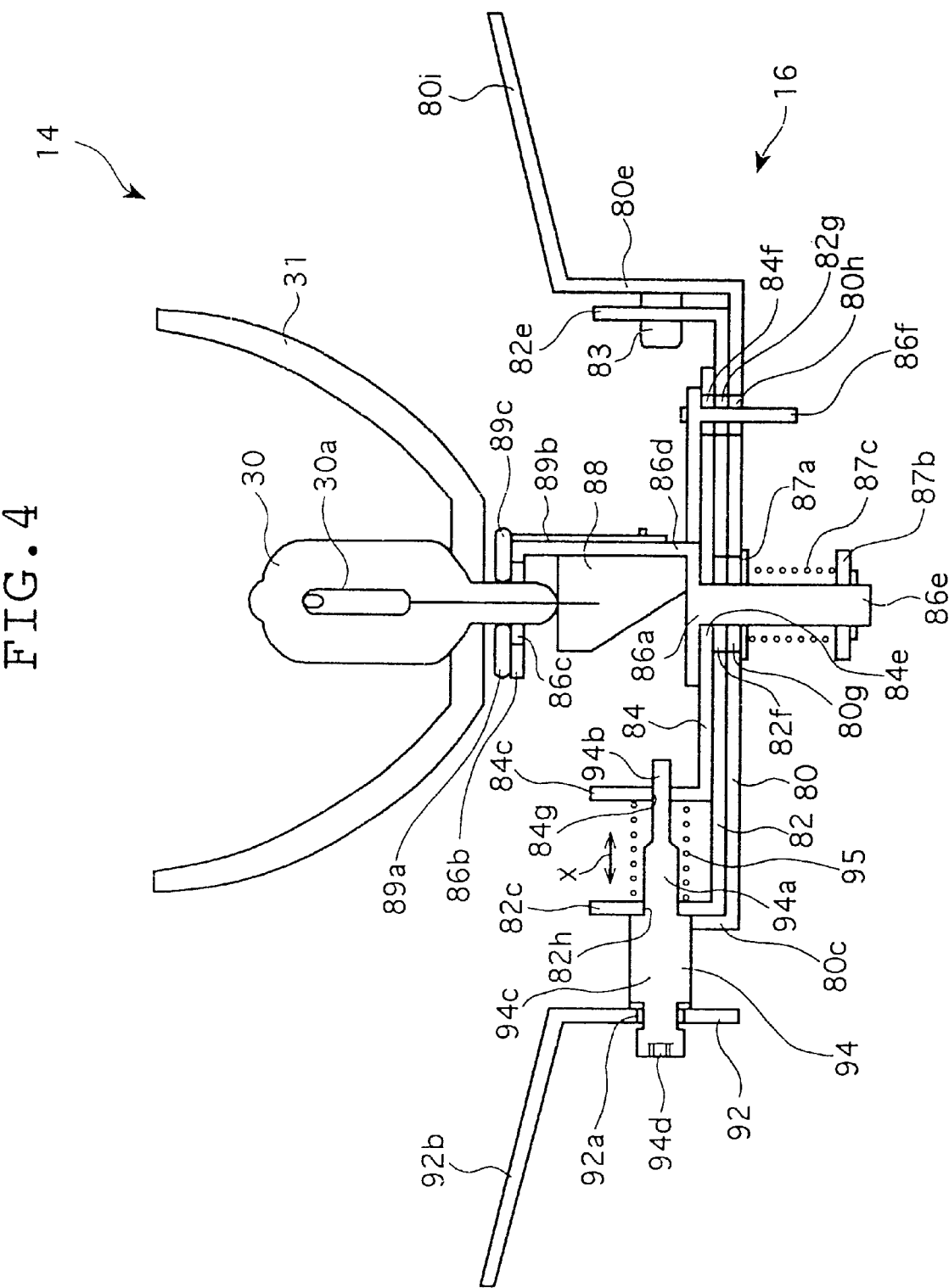
FIG. 4 is a sectional view of the light source device using the light source moving unit shown in FIG. 3.

FIG. 3 shows an embodiment of the light source moving unit 16 of the light source device 14 used in the present invention and FIG. 4 shows a sectional view of an embodiment of the light source device 14 in which the light source 30 and the reflector 31 are mounted on the light source moving unit 16 shown in FIG. 3.

As shown in these drawings, the light source moving unit 16 includes a first frame member 80, a second frame member 82, a third frame member 84, a fourth frame member 86, a socket 88, a first side plate 90 and a second side plate 92.

The first frame member 80 is formed into a box-shaped member having a rectangular bottom surface 80a, and vertical wall surfaces 80b, 80c, 80d, 80e disposed along the four sides of the bottom surface 80a and through holes 80f are located at the four corners of the rectangular bottom surface 80a for fixing the light source moving unit 16, namely, the light source device 14 at a specific position of the light source section 20 of the input device 10.

The second frame member 82 is also formed into a box-shaped member having a rectangular bottom surface 82a and vertical wall surfaces 82b, 82c, 82d, 82e disposed along the four sides the bottom surface 82a, accommodated in the first frame member 80 with the bottom surface 82a thereof placed on the bottom surface 80a in movable contact therewith. Two ball plungers 83 are attached to the vertical wall surface 82e of the second frame member 82, abutted against the vertical wall surface 80e of the first frame member 80 and urges the confronting vertical wall surface 82c of the second frame member 82 so that it comes into movably intimate contact with the vertical wall surface 80c of the first frame member 80.

The third frame member 84 is formed into a box-shaped member having a rectangular bottom surface 84a and vertical wall surfaces 84b, 84c, 84d disposed along the three sides of the bottom surface 84a, accommodated in the second frame member 82 with the bottom surface 84a thereof placed on the bottom surface 82a in movable contact therewith. Two ball plungers 85 are attached to the vertical wall surface 84d of the third frame member 84, abutted against the vertical wall surface 82d of the second frame member 82 and urges the confronting vertical wall surface 84b of the third frame member 84 so that it comes into movably intimate contact with the vertical wall surface 82b of the second frame member 82.

The fourth frame member 86 is composed of a C-shaped member having the non-conductive socket 88 fixed in it, accommodated in the third frame member 84 with the bottom surface 86a thereof placed on the bottom surface 84a of the third frame member 84 in movable contact therewith. An opening 86c is defined to the top surface 86b of the fourth frame member 86 to mount the light source 30. A non-conductive plate member 98a extending from one side of the opening 86c is fixed on the top surface 86b and a non-conductive plate member 89c which is fixed to a leaf spring 89b fixed to the vertical side surface 86d of the fourth frame member 86 extends to the other side of the opening 86c and the light source 30 is clamped by the two plate members 89a, 89c.

As shown in FIG. 4 in detail, a rotatable shaft 86e whose center is matched with the center of the light source 30 and a rod-shaped member 86f spaced apart from the rotatable shaft 86e by a specific interval are fixed to the bottom surface of the fourth frame member 86. The rotatable shaft 86e is rotatably engaged with a round hole 84e defined to the bottom surface 84a of the third frame member 84, movably passes through openings 82f, 80g defined to the bottom surfaces 82a and 80a of the second and first frame member 82 and 80, and projects through the round hole of a washer 87a closing the opening of the bottom surface 80a. A washer 87b is fitted to the projecting end of the rotatable shaft 86e by a locking ring or the like so that it is not removed therefrom, a compressed spring 87c is interposed between the washers 87a and 87b and closely fix the first to fourth frame members 80, 82, 84, 86 by the spring force thereof so that they can be turned or moved relatively with respect to each other.

On the other hand, the rod-shaped member 86f passes through the slots 80h, 82g, 84f defined to the first to third frame members 80, 82, 84 and projects to a back side from the bottom surface 80a of the first frame member 80. The position of the filament 30a of the light source 30 can be adjusted in a θ-direction by turning the fourth frame member 86 about the rotatable shaft 86e using the rod-shaped member 86f.

As shown in FIG. 3 and FIG. 4, the second side plate 92 is fixed to the vertical wall surface 82c by screws and nuts through two rod-shaped members 93 each having a specific length so that it keeps a specific interval from the outside of the vertical wall surface 80c of the first frame member 80 which is in intimate contact with the vertical wall surface 82c of the second frame member 82 from the outside thereof. In addition, a drive screw shaft 94, which is composed of a cylindrical portion 94a rotatably engaged with a round hole 82h defined to the vertical wall surface 82c at the position thereof which is located on the center line between the two rod-shaped members 93 and a male thread portion 94b threaded with the female thread portion 84g formed in the vertical wall surface 84c of the third frame member 84, is interposed between the vertical wall surface 82c of the second frame member 82 and the vertical wall surface 84c of the third frame member 84 to move the third frame member 84 in the direction of arrow X in the drawing with respect to the second frame member 82. A compressed spring 95 through which the cylindrical portion 94a and the male thread portion 94b of the screw shaft 94 pass at the center thereof is interposed between the vertical wall surfaces 82c and 84c so as to urge them. The screw shaft 94 has an end surface abutted against the outside surface of the vertical wall surface 82c and is composed of the cylindrical portion 94a and a hexagonal prism portion 94c continuous to the cylindrical portion 94a and the end of the hexagonal prism portion 94c passes through the opening 92a defined to the second side plate 92 and has a hexagonal hole 94d formed to the extreme end thereof to permit a hexagonal wrench to be engaged with the hexagonal hole 94d. The rotation of the screw shaft 94 by the hexagonal wrench engaged with the hexagonal hole permits the third frame member 84 to be moved along the screw shaft 94, that is, in the direction of arrow X in the drawing. The hexagonal prism portion 94c of the screw shaft 94 is pressed by a leaf spring 96 engaged with the two rod-shaped members 93 at both the ends thereof. As a result, in the present invention, the drive screw shaft 94 is locked by the hexagonal prism portion 94c each time it rotates ⅙ revolution so that the movement in the X-direction of the third frame member 84 can be adjusted with an accuracy of ⅙ of one screw pitch.

As shown in FIG. 3, the first side plate 90 is fixed to the outside of the vertical wall surface 80b of the first frame member 80 through two rod-shaped members 93 so that it keeps a specific interval likewise the second side plate 92. Since a drive screw shaft 97 which is threaded with the female thread portion of the vertical wall surface 82b of the second frame member 82 and rotated while being abutted against the vertical wall surface 80b to thereby move the second frame member 82 in the direction of arrow Y in the drawing with respect to the first frame member 80 and the moving mechanism thereof are arranged likewise the screw shaft 94 except that the screw shaft 94 moves the third frame member 84 in the direction of arrow X in the drawing with respect to the second frame member 82, the description of the drive screw shaft 97 is omitted here.

Figure 5:
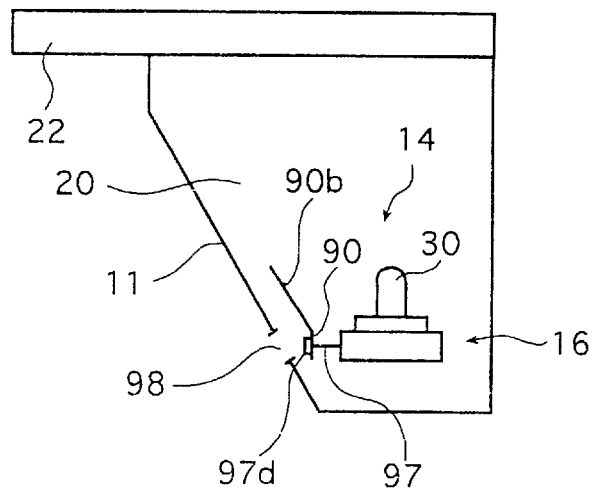
FIG. 5 is a longitudinal sectional diagrammatic representation of the light source section using the light source device in which the a light source is assembled to the light source moving unit shown in FIG. 3.
Figure 6:
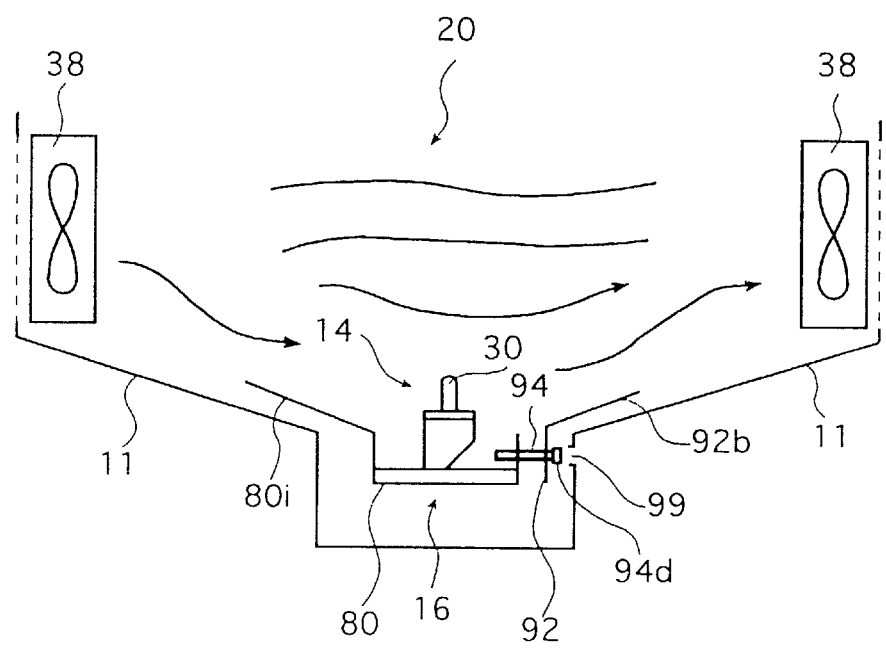
FIG. 6 is a lateral sectional diagrammatic representation of the light source section using the light source device shown in FIG. 4.

As shown in FIG. 5 and FIG. 6, the drive screw shafts 97, 94 can be rotated by the rotation of a tool such as the hexagonal wrench or the like which is inserted through openings 98 and 99 defined to the front surface and a lateral side surface of the exterior cover 11 of the input device 10 from the outside thereof and engaged with the hexagonal holes 97d, 94d of them. As described above, the movement of the light source 30 in the X-Y directions can be adjusted by moving the third frame member 84 in the X-direction and the second frame member 82 in the Y-direction by the drive screw shafts 94, 97 which are rotated, respectively from the outside of the exterior cover 11, that is, from the front surface and the lateral side surface thereof in the light source device 14. Note, although the tool for moving the second frame member 82 in the Y-direction and the third frame member 84 in the X-direction is not limited to the hexagonal wrench and any tool may be used, it is preferable to use a general-purpose tool. Thus, the top portion of the drive screw shafts 94, 97 is not limited to the hexagonal hole 94d of the illustrated example and may be formed into a structure corresponding to a tool used.

The light source device 14 can realize a mechanism for adjusting the light source 30 in X-Y-θ directions by the light source moving unit 16 arranged as described above. Note, the light source device 14 used in the present invention is not limited to the illustrated example and may be provided with a light source moving unit which is composed of an X-Y stage without a θ-direction adjusting mechanism achieved by the fourth frame member 86. That is, the light source movement unit may directly hold the socket 88 by the third frame member 84.

In the light source moving unit 16 of the light source device 14 shown in FIG. 3 and FIG. 4, the first side plate 90, the second side plate 92 and the vertical wall surface 80e of the first frame member 80 have light source covers 90b, 92b and 80i which incline and extend externally, respectively. As shown in FIG. 5, the light source cover 90b extends along the inclination of the front surface of the exterior cover 11 of the image input apparatus 10, that is, approximately in parallel therewith to thereby shut off the heat generated from the light source 30, in particular, the radiant heat radiated from the light source 30. Likewise, the light source covers 80i and 92b also extend along the inclinations of both the lateral side surfaces of the exterior cover 11 of the image input apparatus 10, that is, approximately in parallel therewith as shown in FIG. 6 to thereby shut off the heat generated from the light source 30, in particular, the radiant heat radiated from the light source 30. Thus, the excessive temperature increase of the exterior cover 11 caused by the heat from the light source 30, in particular, by the radiant heat therefrom can be prevented so that the temperature of the exterior cover 11 can be suppressed to a proper temperature range below a regulated temperature.

As shown in FIG. 3. FIG. 4 and FIG. 5, the light source covers 80i and 92b which confront the lateral side surfaces of the exterior cover 11 have an inclination which is more gentle than the light source cover 90b which confronts the front surface of the exterior cover 11. This is because that the lateral side surfaces of the exterior cover 11 and the light source covers 80i and 92b preferably have a more gentle inclination to permit two cooling fans 38 disposed on both the sides of the light source section 20 of the image input apparatus 10 to effectively draw cold air externally of the apparatus and supply it to the light source 30 as well as to draw the atmospheric air in the vicinity of the light source 30 and exhaust it to the outside of the apparatus to promote the cooling effect of the light source 30 and its vicinity by the cooling fans 38 as shown in FIG. 6.

With the above arrangement, the light source device 14 used in the present invention can adjust the position of the light source 30 two-dimensionally, that is, in X-Y directions to perform the shading correction of the light source 30 from the outside of the exterior cover 11 of the image input apparatus 10 in the state that the light source 30 is put on.

The light source section 20 is essentially arranged as described above.

The carrier base 22 is disposed above the light source section 20.

The carrier base 22 is a section which has various types of carriers such as the film carrier 28 and the like placed on the upper surface thereof and hold them at a specific position and is fixed vertically with respect to the optical frame 18. The carrier base 22 has an opening formed to the position thereof corresponding to the optical axis L to permit the light from the light source section 20 to pass therethrough (shown by numeral 38 in FIG. 7). The opening is formed to a size which enables the light from the light source section 20 to sufficiently irradiate the entire surface of a maximum size image which is read by the image input apparatus 10 in accordance with the maximum size of a film to be read by the image input apparatus 10.

The carrier base 22 has guide rails 40 and 42 formed on the upper surface thereof in a direction away from the operator toward the optical frame 18, namely, in the direction of arrow y which is perpendicular to the direction of arrow x serving as a film feed direction.

Grooves 44 and 46 are formed of the bottom surface of the film carrier 28 in correspondence to the guide rails 40 and 42.

Therefore, the various type of the carriers such as the film carrier 28 and the like are placed on the carrier base 22 by being positioned at a specific position thereof in such a manner that the position in the direction of arrow x of the carriers placed on the upper surface of the carrier base 22 is regulated by the guide rails 40 and 42 and the grooves 44 and 46 corresponding thereto as well as the position in the direction of arrow y of them is regulated by the inner end surfaces of them in the drawing abutted against the optical frame 18.

The film carrier 28 placed at the specific position on the carrier base 22 feeds the strip A in the longitudinal direction thereof which agrees with the direction of arrow x so that the respective images recorded on the strip A are sequentially fed to a specific position on the optical axis L, namely, the reading position Z corresponding to the opening of the carrier base 22 for reading.

As described above, the groove 44 corresponding to the guide rail 40 of the carrier base 22 and the groove 46 corresponding to the guide rail 42 thereof are formed on the bottom surface of the main body 48 of the film carrier 28.

The upper surface of main body 48 is provided with a guide groove 50 which extends from an end to the other end of the main body 48 in an area intercepting the optical axis L in the feed direction shown by arrow x. The guide groove 50 is substantially as wide as the strip A. The strip A is fed in the longitudinal direction thereof which agrees with the direction of the arrow x in the state that it is inserted into the guide groove 50 so that the respective images are sequentially fed to the reading position Z on the optical axis L. Thus, the depth of the guide groove 50 is set such that the image plane (namely, the emulsion plane) of the strip A is located at a specific position in the direction of the optical axis L (in the direction of a focal depth).

Further, the main body 48 of the film carrier 28 has an opening formed at the reading position Z thereof to permit the reading light from the light source section 20 to pass therethrough. The opening also serves as a mask for regulating the light (reading area) incident on the image of strip A and has a size and a shape corresponding to the strip A. Note, it is needless to say that when the film carrier 28 is disposed to a specific position on the carrier base 22, the reading position Z is located at a specific position on the optical axis L corresponding to the opening of the carrier base 22.

The guide groove 50 is fitted with feed means 52 for feeding the strip A, a film compressing unit 54 and an image plane detecting sensor 56 which are arranged in that order from an upstream side to a downstream side in the x-direction.

The feeding devices 52 is composed of, for example, a motor and feed rollers, feeds the strip A in the direction of arrow x and sequentially stops the images at the reading position Z, resumes the feed of the strip A when it receives a reading finish signal and feeds next images to the reading position Z.

When the image is read, the film compressing unit 54 corrects the curl and the like of the strip A by compressing the strip A against the guide groove 50 in the vicinity of the image to thereby keep the position of the entire surface of the image at a specific position in the direction of the optical axis L. The film compressing unit 54 is composed of a compressing member 58 and turning member for turning the compressing member 58 in the direction of arrow b about a shaft 60 and the compressing member 58 is turned upward when the strip A is fed and downward when the image of the strip A is read to thereby compress the strip A at the reading position Z.

The image plane detecting sensor 56 is a known optical sensor and regulates the position of the image at the reading position Z by detecting the image recorded downstream of the reading position Z and a DX code. In the film carrier 28 of the illustrated example, the strip A fed by the feeding device 52 is controlled to sequentially stop the respective images at the reading position Z as well as compressed by the film compressing unit 54 and released therefrom in response to the result of detection effected by the image plane detecting sensor 56.

Note, the image input apparatus 10 may include various type of carriers which can be mounted at the specific position on the carrier base 22, in addition to the film carrier 28 for automatically feeding the respective images of the strip A to the reading position Z.

For example, the image input apparatus 10 may include a slide carrier which feeds a so-called slide which is composed of a film having an image recorded thereon and held by a frame in the direction of arrow x, stops it at the reading position Z for subsequent reading and collects the slide B whose image having been read, a manual carrier by which the operator fixes a strip and a slide at the reading position Z, a trimming carrier by which the operator disposes a film or a slide at an arbitrary position for reading, and the like.

The imaging unit 24 is disposed to the upper portion of the optical frame 18.

The imaging unit 24 includes a lens unit 64 and a focus adjusting motor 66 which are vertically disposed to a level block 62 fixed to the optical frame 18 and images the projection light of the strip A to the image sensor 26.

The lens unit 64 includes a zoom lens section 68 and a focus adjusting lens section 70. The zoom lens section 68 has a known zoom lens assembled thereto which changes a magnification in accordance with the size of the image recorded on the strip A and images the projection light to the image sensor 26 by adjusting the size thereof to a maximum size which can be received by the image sensor 26 (that is, a size which permits the longest portion of a necessary image region to inscribe the light receiving surface of the image sensor 26) and the focus adjusting lens section 70 is positioned on the zoom lens section 68 and has a known focus adjusting lens assembled thereto to adjust the focus of the projection light on the light receiving surface of the image sensor 26. The adjustment gear 70a of the focus adjusting lens section 70 is meshed with a gear 66a which is rotated by the focus adjustment motor 66 and the focus is adjusted by the focus adjusting motor 66.

The focus adjustment motor 66 is driven by being controlled by the focus adjusting means 76 of the controller 12 and performs an automatic focus adjustment using the contrast of the image read by the image sensor 26 by, for example, a TTL (through the lens) system.

The projection light of the strip A and the like is imaged to the image sensor 26 by the lens unit 64 and photoelectrically read. Further, a known shutter (not shown) used to dark correction and the like is interposed between the lens unit 64 and the image sensor 26.

In the image input apparatus 10 for two-dimensionally reading the image, the image sensor 26 is an area sensor such as, for example, a CCD sensor having 1380×920 pixels.

Further, in the apparatus of the illustrated example, the image sensor 26 is adapted to be movable in both the x- and y-directions by an amount corresponding to half a pixel and this can increase the apparent number of reading pixels by a factor of up to four.

In the image input apparatus 10 of the illustrated example, the accumulation of the image sensor 26 can be increased, if necessary.

As described above, although the difference in the image densities of the original image recorded on strip A is absorbed by the adjustment of the variable stop 32 in the image input apparatus 10 using the light source device 14 of the illustrated example as the light source section 20, when an image of high density or low density whose difference in densities cannot be absorbed even if the variable stop 32 is used, the image is properly read using the adjustment of the accumulation time of the image sensor 26 together with the variable stop 32.

Note, the accumulation time is adjusted by the controller 12 to be described later based on the image data obtained by prescanning.

The signal from the image sensor 26 is supplied to the controller 12.

The controller 12 includes image processing device 72, focus adjusting device 73, a control unit 74 for performing the light source position adjusting method of the present invention as well as controls and manages the image input apparatus 10 (or the digital photoprinter) as a whole, a condition setting unit 78 for setting image processing conditions, a memory 79 for storing (registering) an initial light source position used to perform the light source position adjusting method of the present invention and information necessary to operate the image input apparatus 10, and the like. Further, connected to the controller 12 are a display 75 for displaying the image read by the image sensor 26, indicating the setting of a print size and color/density and replacement of a lamp and displaying the balanced state of the quantity of light of the light source 30 (shading) on the plane of a film original when a lamp is replaced, and the like, a keyboard 76 and a mouse 77 for performing various settings as to the reading (output) of images such as the setting of the print size, a main subject and the like, as well as performing the operation of the image input apparatus 10 such as the determination whether the lamp must be replaced or need not be replaced, and the like.

That is, the controller 12 performs the light source position adjusting method of the present invention, operates and controls the image input apparatus 10 (or the photoprinter) as a whole and processes the signal output from the image sensor 26.

The signal from the image sensor 26 is essentially supplied to the image processing device 72. The image processing device 72 subjects the signal to various kinds of necessary processing such as A/D conversion, logarithmic transformation, shading correction, dark correction, offset correction, etc. and supplies the signal to the display 75 and a recording device P as image information. The image processing device 72 is composed of the combination of a memory, a known image processing circuit and the like for performing the various kinds of processing.

The condition setting unit 78 is connected to the image processing device 72. As known well, various types of conventional image input apparatuses ordinarily execute prescanning for roughly reading an image prior to the reading of the image for the output of it (main scanning). In this case, the condition setting unit 78 determines reading conditions such as the determination of an amount of adjustment of the variable stop 32 from the image data obtained in the prescanning each time the respective colors are read in the main scanning as well as sets the above image processing conditions in the image processing device 72 from the image data, the main subject set as necessary and the processing conditions being input.

The focus adjusting device 73 is further connected to the image processing device 72. The focus adjusting device 73 controls the aforesaid focus adjustment motor 66 to thereby adjust the focus adjusting lens section 70 of the lens unit 64 and sets the focus of the projection light in the main scanning to the light receiving surface of the image sensor 26. In the illustrated example, the focus is automatically adjusted using the image contrast of the image read by the image sensor 26 using the TTL system.

The control unit 74 controls and manages the image input apparatus 10 (or the digital photoprinter) as a whole such as, for example, the adjustment of the variable stop 32 in accordance with the stop value set by a condition setting unit 84 according to the prescanned image data, the indication of the start of the main scanning after the completion of the prescanning, the indication of the start of reading of a next image, the detection of various troubles, the display of an error message on the display 75 and the like.

The image input apparatus 10 using the light source device 14 of the illustrated example as the light source section 20 is essentially arranged as described above. Next, the operation of the image input apparatus 10 and the light source position adjusting method of the present invention will be described below in detail.

Prior to the start of reading, necessary operation such as the setting of a print size and the like will be performed using the keyboard 76 and the mouse 77.

Whereas, when it is confirmed that the quantity of light from the light source section 20 is set to a specific value, the compressing member 58 of the film compressing unit 54 is moved upward, the strip A is loaded on the carrier base 22 so that a first image recorded on the strip A is positioned at the reading position Z and the start of reading is indicated.

When the start of reading is indicated, the G filter 34G is inserted first and a G image is read likewise the prescanning to be executed later, an amount of adjustment of the focus is determined from the thus obtained image contrast of the image and the focus adjusting means 73 adjusts the focus adjusting lens section 70 by driving the focus adjusting motor in accordance with the amount of adjustment.

Next, the prescanning is started and the variable stop 32 is released (or adjusted to a prescribed stop value) in the light source section 20. Since the G filter 34G is inserted into the light passage L in the above focus adjusting process, the light regulated by the G filter 34G passes through the strip A and is made to the projection light bearing the G image, the projection light is imaged to the image sensor 26 by the lens unit 64 and the G image of the original image is photoelectrically read, whereby the reading of the G image is finished.

The image data of the G image read by the image sensor 26 is supplied to the image processing device 72 of the light source device 14 and stored to the memory of the image processing device 72 as well as supplied to the condition setting unit 78.

The condition setting unit 78 determines the amount of adjustment of the variable stop 32 from the image data of the G image so that it is used when the G image is read in the main scanning. Note, the amount of adjustment of the variable stop 32 can be determined by a known method of using, for example, a LATD (large area transmitting density) or the like.

On the completion of reading of the G image in the prescanning, the color filter plate 34 is turned and, for example, the R filter 34R is next inserted into the light passage L, the R image of the original image is read and the image data of the R image is supplied to and stored in the image processing device 72 likewise. Further, the condition setting unit 78 determines the amount of adjustment of the variable stop 32 and other factors when the R image is read in the main scanning, and the like. In addition, the B image is read and the amount of adjustment of the variable stop 32 and other factors are determined likewise, whereby the prescanning is finished.

The controller 12 displays the image obtained in the prescanning on the display 75 and sets the main subject if necessary and the condition setting unit 78 reads out the image data stored to the memory of the image processing device 72 and determines the image processing conditions in the image processing device 72 when the main scanning is performed in accordance with the thus read image data, the main subject being set, and the like. Note, the amounts of adjustment of the variable stop 32 when the respective R, G, B images are read in the main scanning may be determined after the images of the three colors are read in the prescanning.

When the reading conditions and the image processing conditions are determined and the focus adjustment and the like are finished, the control unit 74 indicates to start the main scanning.

When the main scanning is started, the variable stop 32 is adjusted in accordance with the amount of stop adjustment for reading the G image which was previously determined by the condition setting unit 78, the G filter 34G is inserted into the light passage L at the same time, the quantity of light is adjusted by the variable stop 32, the light regulated by the G filter 34G passes through the strip A, the projection light is imaged to the image sensor 26 by the lens unit 64, and the G image of the original image is read and supplied to the controller 12.

On the completion of reading of the G image, the variable stop 32 is adjusted in accordance with the amount of stop adjustment previously determined by the condition setting unit 78 when the R image was read, the R filter 34R is inserted into the light passage L at the same time, the quantity of light is adjusted by the variable stop 32, the R image is read and supplied to the controller 12 likewise and further the B image is read and supplied to the controller 12 likewise.

The image processing device 72 of the light source device 14 subjects the signal output from the image sensor 26 to specific processing such as A/D conversion and the like in accordance with the image processing conditions determined by the condition setting unit 78 and outputs the signal to the recording device P as image information to be output.

The image input apparatus 10 of the present invention operates as described above. When, however, the light source 30 is mounted, replaced or serviced, there is a possibility that the position of the light source 30 is moved and further when the lens unit 64, the image sensor 26 and the like are adjusted, there is also a possibility that the relative position of the light source 30 is varied. In such cases, the light source position adjusting method of the present invention will be executed to correct the shading of the light source 30.

Figure 7:
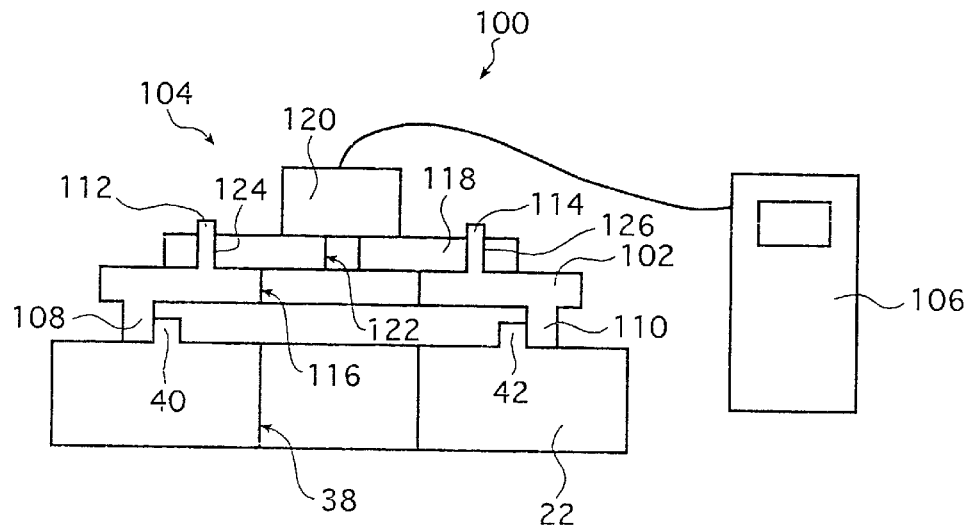
FIG. 7 is a schematic sectional view of an embodiment of a dedicated measuring jig used to register a initial light source position in the light source position adjusting method of the present invention.
Figure 8A:
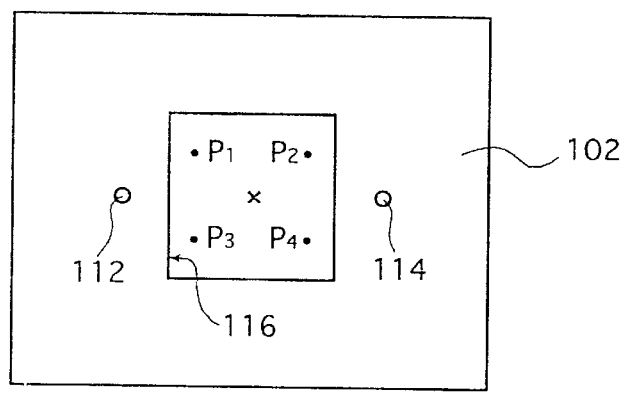
FIG. 8(A) and FIG. 8(B) are a top view of the support table of the measuring jig and a bottom view of a power meter main body (positioning plate) shown in FIG. 7, respectively.
Figure 8B:
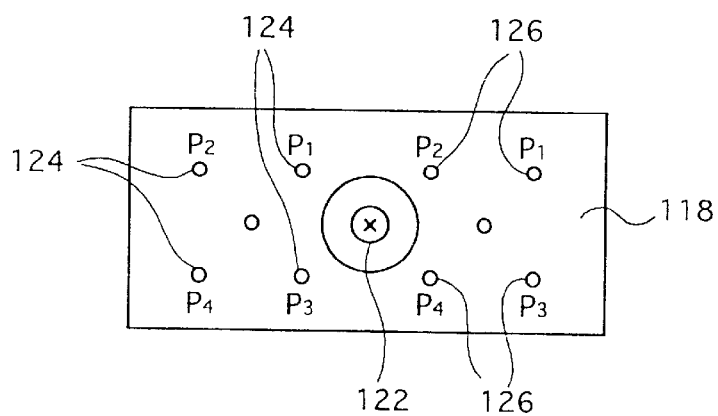

In the light source position adjusting method of the present invention, before the apparatus is shipped from a factory, or after the image sensor 26 or its peripheral circuit is replaced or repaired when it is contemplated that the balanced state of the sensitivity of the image sensor 26 is varied depending upon the light receiving positions thereof because the image sensor 26 itself and its peripheral circuit are replaced or repaired due to failure, it is required that the balance of the quantity of light of the light source 30 on the plane of a film original (more correctly, a plane corresponding to a film original plane) is previously adjusted using a dedicated tool shown in FIG. 7, FIG. 8(A) and FIG. 8(B). Thereafter the balanced state of the light source 30 whose balance of the quantity of light has been adjusted is actually measured by the image sensor 26 and the actually measured balanced state of the light source 30 is stored (registered) in the memory 79 of the controller 12 as an initial light source position.

Figure 9:
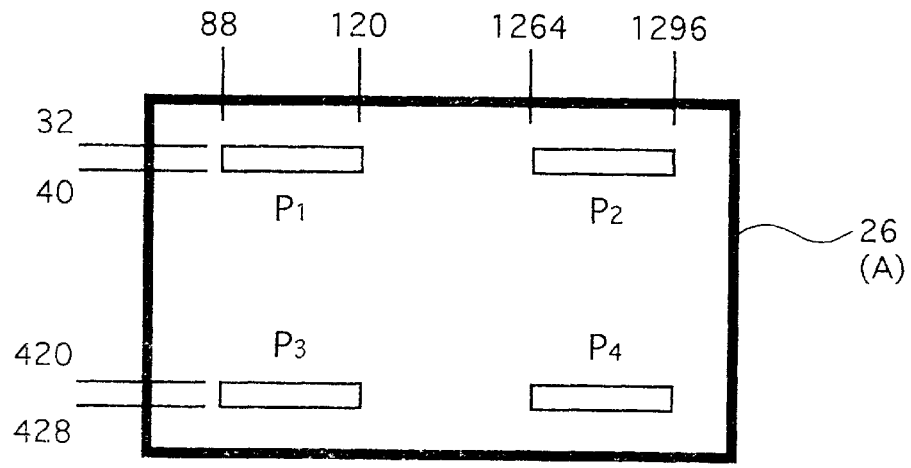
FIG. 9 is a view showing the plane of a film original to be measured for embodying the light source position adjusting method according to the present invention and an example of a measuring point in an image sensor.

Incidentally, in the present invention, the balance of the quantity of light of the light source on a film original plane is measured at a plurality of measuring points, namely, peripheral points located at positions which are symmetrical with respect to the center of the film original plane, for example, at least three points of specific positions in the vicinities of the four corners shown by $P_1$, $P_2$, $P_3$ and $P_4$ in FIG. 9. FIG. 9 shows the light receiving region, namely, the effective pixel region of the image sensor 26 which agrees with the image projected from the original surface of a 135 film when the lens unit 64 is set to a standard magnification and the respective measuring points $P_1$, $P_2$, $P_3$ and $P_4$ show pixel areas (each area has 32×8 pixels32 256 pixels) which are added and averaged at the respective points. Incidentally, as to the measuring points $P_1$, $P_2$, $P_3$ and $P_4$ shown in FIG. 9, the measuring point $P_1$, for example, is the region of 256 pixels which covers the area of 8 pixels from the 32th pixel to the 40th pixels from the upper end of the image sensor 26 in a vertical direction and the area of 32 pixels from the 88th pixel to the 120th pixels from the left end thereof in a horizontal direction and the measuring point $P_2$, $P_3$, $P_4$ are also arranged likewise. Note, the number and disposition of the measuring points and the size (the number of pixels) of the pixel area of each point are not particularly limited and the points need only be specific pixel areas which are located in the peripheries which are symmetrical with respect to the center, it suffices for the measuring points to permit the quantities of light in at least two directions to be balanced (adjusted) and the points may be positioned, for example, on diagonal lines as shown in the illustrated example or on cross lines.

A dedicated measuring tool 100 used to the present invention will be described. As shown in FIG. 7, the measuring tool 100 includes a support table 102 which is positioned and placed on the carrier base 22 of the image input apparatus 10, a power meter main body 104 positioned on the support table 102 in correspondence to the above measuring points and measuring the quantity of light (the intensity of light) of one measuring point and a display meter 106 for displaying the result of measurement. As shown in FIG. 7 and FIG. 8(A), the support table 102 has leg sections 108, 110 which are disposed on the lower surface thereof and positioned by being engaged with the guide rails 40 and 42 of the carrier base 22 of the optical frame 18 from the outsides thereof, respectively, positioning pins 112, 114 disposed on the upper surface thereof to position the power meter main body 104 and an opening 116 which is defined therethrough at the center thereof and has a size corresponding to the film size (image size) of a film original, for example, as large as or a little larger than the film size. The opening 116 corresponds to the opening defined at the center of the carrier base 22 so that the projection light passes therethrough. FIG. 8(A) shows the points corresponding to the measuring points $P_1$, $P_2$, $P_3$ and $P_4$ in the opening 116.

As shown in FIG. 7 and FIG. 8(B), the power meter main body 104 includes a positioning plate 118 and a power meter 120 fixed to the positioning plate 118. As shown in FIG. 8(B), the positioning plate 118 includes an opening 122 defined at the center thereof for introducing light to the light receiving portion of the power meter 120 and respective four positioning holes 124 ($P_1$, $P_2$, $P_3$, $P_4$), and 126 ($P_1$, $P_2$, $P_3$, $P_4$) defined thereto to permit the positioning pins 112, 114 of the support table 102 to be inserted thereinto so that the center of the opening 122 is positioned to the corresponding measuring points $P_1$, $P_2$, $P_3$ and $P_4$ shown in FIG. 8(A).

FIG. 8(A) is a top view of the support table 102 and FIG. 8(B) is a bottom view of the power meter main body 104 and shows the bottom surface of the positioning plate 118 of the power meter main body 104. The opening 122 can be positioned at the measuring point $P_1$ and accordingly the light receiving portion of the power meter 120 can be positioned at the measuring point $P_1$ by, for example, causing $P_1$ of the positioning hole 124 and $P_1$ of the positioning hole 126 to correspond to the positioning pins 112, 114 and inserting the pins 112, 114 into the positioning holes. Likewise, when the measuring points $P_2$, $P_3$ and $P_4$ are measured, the light receiving portion of the power meter 120 can be positioned at the respective measuring points by inserting the corresponding positioning holes 124, 126 into the positioning pins 112, 114, respectively.

The power meter 120 for measuring the intensity of light (the quantity of light) of the light source 30 irradiated to the light receiving portion thereof is arranged such that when the measuring tool 100 is placed at the position of the light receiving portion of the power meter 120, namely, on the carrier base 22, the position where the upper surface of the positioning plate 118 is in contact with the power meter 120 is located at the position of a film original plane when the film carrier 28 is disposed on the carrier base 22. Note, the measuring instrument is not limited to the power meter in the present invention and any instrument may be used so long as it can measure the quantity, intensity and illuminance of the light source and an illuminance meter, for example, may be used. The display meter 106 displays the intensity and illuminance of light measured by the power meter 120 and may display a numerical value in an analog fashion using an indicator such as a needle or in a digital fashion. The power meter 120 is connected to the display meter 106 through a cord.

Although the measuring tool 100 used in the present invention is essentially arranged as described above, the present invention is not limited thereto. Although it is preferable to arrange the measuring tool 100 as a dedicated tool, a general-purpose tool may be used in place of it or the illuminance meter may be used for manual and visual measurement.

Next, how the initial position of the light source 30 is registered by the use of the dedicated measuring tool 100 of the present invention will be described. First, if any carrier is mounted on the carrier base 22 of the optical frame 18, the carrier is removed and the dedicated measuring tool 100 is disposed on the carrier base 22 as shown in FIG. 7. It is assumed here that the corresponding positioning holes 124 ($P_1$) and 126 ($P_1$) of the power meter main body 104 are engaged with the positioning pins 112, 114 of the support table 102 to permit the power meter main body 104 to measure the measuring point $P_1$. Electric power is supplied to the apparatus, the light source 30 is put on, the variable stop 32 is released, and the color filter plate 34 is opened, namely, any of the color filters 34R, 34G and 35B is not inserted. When the light source position is adjusted by the dedicated measuring tool 100, the light source 30 and the like are set to default conditions (to be described later). Then, the intensity of light at the measuring point $P_1$ is measured by the operator and the value displayed on the display meter 106 is read.

The operator continues the light intensity measuring job while changing the position of the power meter main body 104 to the measuring points $P_2$, $P_3$ and $P_4$ as well as adjusts the position of the light source 30 so that the quantities of light (the intensities of light) are made as uniform as possible at the measuring points $P_1$, $P_2$, $P_3$, $P_4$ by turning the drive screws 97 and 94 of the light source moving unit 16 rightward and leftward through the round hole 98 defined to the front surface of the exterior cover 11 and the round hole 99 defined to the right side surface thereof using a hexagon wrench in the state that the light source 30 is put on. Although an allowable limit of adjustment is not particularly limited, it is preferably as small as possible and set to ±2% in the illustrated example. When the intensities of light at the measuring points $P_1$, $P_2$, $P_3$, $P_4$ are represented by, for example, $I_1$, $I_2$, $I_3$, $I_4$, respectively, it suffices to suppress the variation of the values of the ratios $I_2/I_1$, $I_3/I_1$, preferably the value of $I_4/I_1$ in addition to the above and more preferably the values of $I_2/I_4$, $I_3/I_4$ in addition to the above to ±2% or less.

Note, in the present invention, it is possible to make the intensities of light $I_2$, $I_3$ at the measuring point $P_2$ and $P_3$ as near as possible to the intensity of light $I_1$ at the measuring point $P_1$ and omit the measurement at the measuring point $P_4$. This is because it can be contemplated that the intensity of light of the light source 30 is distributed on the plane of the film original (A or B) in such a manner that it is increased toward the center of the plane and decreased toward the periphery thereof and the contour lines of the same intensities of light are approximately concentrically distributed. Thus, since the center of concentric circles is located at the center of the light source 30 and each of the circles showing the same intensities of light can be defined by three points, it can be said that if the intensities of light $I_1$, $I_2$, $I_3$ are approximately the same at the measuring point $P_1$, $P_2$, $P_3$, a circle passing through these measuring points can be specified and further the circle also passes through the measuring point $P_4$ and the center of the circle is located at the center of the light source 30.

When the quantity of light (the intensity of light) of the light source 30 is balanced on the film original plane and accordingly on the light receiving surface (effective pixel region) of the image sensor 26 using the dedicate measuring tool 100 and thus the position of the light source 30 is adjusted so that the quantity of light (the intensity of light) is balanced in the periphery of the light receiving region, that is, when the center of the light source 30 is adjusted so as to be located at the center of the light receiving region, the apparatus is de-energized, the light source is put off and the measuring tool 100 is removed from the carrier base 22.

Thereafter, the apparatus is placed in an initial light source position registering mode by the controller 12. Then, the 135 film carrier 28 is preferably mounted on the carrier base 22. After the light source section 20 such as the light source 30 and the like and the imaging unit 24 are set to the following default conditions or it is confirmed that they have been set to the default conditions, electric power is supplied to thereby put on the light source 30.

| | |
|---|---|
| color filter plate 34 | G filter 34G |
| variable stop 32 | 205 |
| light source lamp 30 | 21 V |
| electronic shutter 291 | |
| lens unit 64 | ×0.433 |

At the time, the film original A is not loaded on the film carrier 28 and the film carrier 28 is released, the variable stop 32 is set to the above value, the G filter 34G is set to the color filter plate 34, the lens unit 64 is set to the above specific focus position, and the light emitted from the light source 30, diffused by the diffusion box 36 and passed through the opening of the film carrier 28, namely, the image projected from the light source (hereinafter, referred to as a light source image) is imaged to the entire effective area of the image sensor 26. The above magnification setting condition of the lens unit 64 is the same as the prescanning condition of a reversal film which can cause the image of the film original to just inscribe the entire effective area of the image sensor 26.

Thereafter, the image data of the light source image read by the image sensor 26 is supplied to the image processing device 72 of the controller 12 likewise the aforesaid case that the image of the film original A was read, subjected to necessary image processing and then displayed on the monitor display 75. Although the image displayed on the display may show the balanced state of the light source image by contour lines located at intervals of a specific density (a quantity of light), since the image data from the entire area of the image sensor 26 must be subjected to the image processing in this case, a problem arises in a time necessary until the image data is subjected to the image processing and displayed. To deal with this problem, it is preferable in the present invention that only a plurality of measuring points are extracted from the entire effective area of the image sensor 26 and the image is displayed on the monitor using the image data at these measuring points. In the present invention, the initial light source position is registered by storing the image data at the plurality of measuring points to the memory 79.

In the illustrated example, there are determined using, for example, a cumulative adder or the like the added and averaged values $I_{10}$, $I_{20}$, $I_{30}$ of the outputs from the image sensor 26, to which the light source image is projected, in the respective areas thereof each having 256 pixels (32×8 pixels) at the measuring points $P_1$, $P_2$, $P_3$ shown in FIG. 9 among the outputs from the image sensor 26. Thereafter, the calculation of the following formula (1) is executed.

$X_0 = I_{20}/I_{10}$ $Y_0 = I_{30}/I_{10}$ (1)

The thus obtained output values and the ratios $X_0$ and $Y_0$ thereof are stored to the memory 79. Since these values are obtained in the state that the center of the light source 30 is matched with the film original plane and the light receiving surface of the image sensor 26 and the quantity of light of the light source 30 is uniformly distributed in the periphery of the film original plane, the values take irregular sensitivity (shading) depending upon the light receiving positions of the image sensor 26 into consideration.

Thereafter, since the quantity of light of the light source 30 is ideally distributed on the film original surface to a perfect mountain-shape which is symmetrical with respect to the center of the film original surface as a symmetrical axis, the quantity of light of the light source 30 is distributed in such a manner that it is high at the center of the light source 30 and low in the periphery thereof, that is shading is caused to the light source 30 and further there exist irregularity of sensitivity depending upon the positions of the image sensor 26, that is, there also exist shading. Thus, shading correction is automatically performed to make the output values from the entire effective pixel area of the image sensor 26 uniform or substantially uniform.

The initial light source position registering mode is finished by the execution of the above processes and thereafter the process returns to an ordinary image reading mode so that the aforesaid ordinary image reading job can be performed.

Incidentally, when the position of the light source 30 is moved by the attachment, replacement, service and the like of it or the relative position of the light source 30 is varied by the physical adjustment of the lens unit 64, the image sensor 26 and the like, the shading correction method according to the adjustment of the light source position of the present invention is performed. The shading correction method will be described as to the replacement of the light source 30 as a typical example. First, the apparatus is placed in a light source position adjusting mode by the controller 12. Next, an old light source 30 is removed and a new light source 30 is attached to the socket 88 of the light source moving unit 16 by removing or opening the exterior cover 11 of the image input apparatus 10. At the time, the power supply (not shown) to the light source device 14 is shut off. Thereafter, the exterior cover 11 is closed and if a carrier mounted on the carrier base 22 is not the 135 film carrier 28, it is preferably replaced with the film carrier 28 and thereafter electric power is supplied to thereby put on the light source 30. At the time, the film original A is not loaded on the film carrier 28, the film carrier 28 is released and the light source section 20 and the imaging unit 24 are set to the aforesaid default conditions likewise the time when the initial light source position was registered. Further, the light emitted from the light source 30, diffused by the diffusion box 36 and passed through the opening of the film carrier 28, namely, the light source image is imaged to the entire area or the necessary area of the image sensor 26.

Next, the added and averaged values $I_{11}$, $I_{21}$, $I_{31}$ of the outputs from the sensor (CCD) in the respective areas thereof each having 256 pixels at the measuring point $P_1$, $P_2$, $P_3$ are determined likewise the time when the initial light source position was registered and the calculation of the following formula (2) is executed.

$X_1 = I_{21}/I_{11}$ $Y_1 = I_{31}/I_{11}$ (2)

Subsequently, the calculation of the following formula (3) is executed.

$X = X_1/X_0$ $Y = Y_1/Y_0$ (3)

Figure 10:
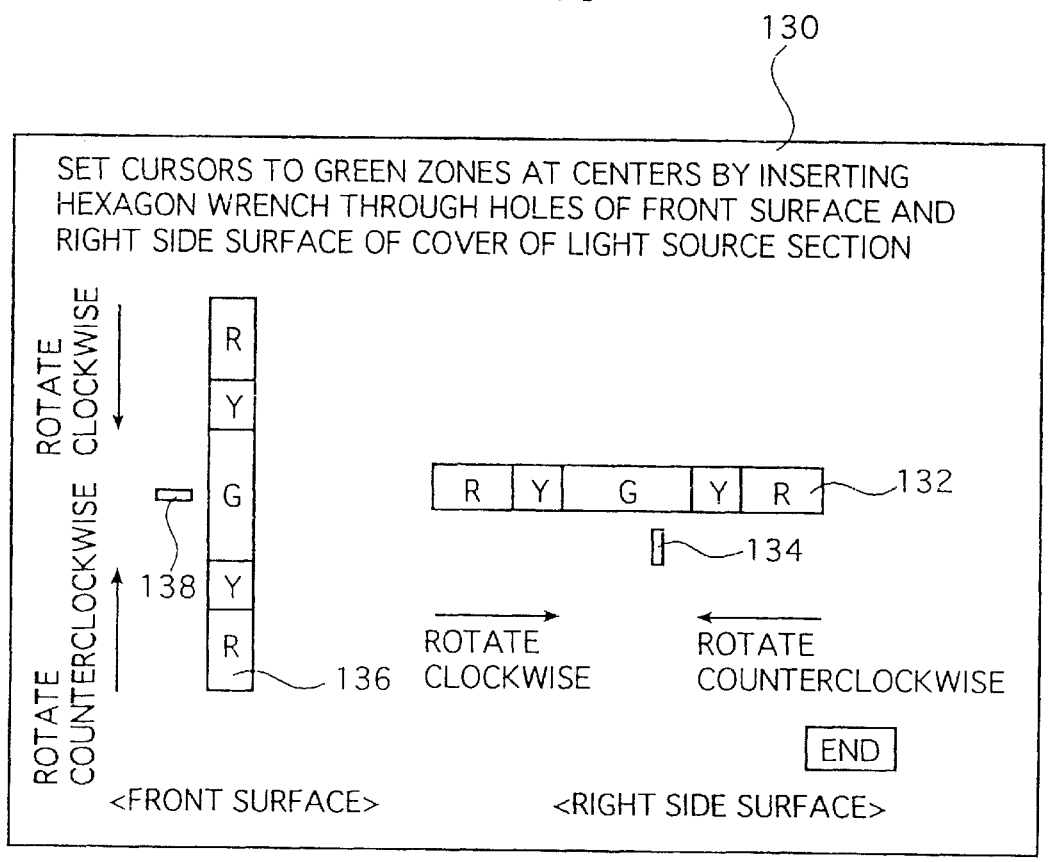
FIG. 10 is a view describing an example of the display screen of a monitor on which a measuring result measured at the measuring point of the image sensor shown in FIG. 9.

The thus obtained result, namely, X, Y are displayed on the display 75. FIG. 10 shows an example of the display screen 130 of the display 75. A strip-shaped indicator 132 in an X-(horizontal) direction shown on the right side in the drawing shows a displaced amount from the ratio $X_0$ in color which was determined and registered when the initial light source position was registered. G shows that the indication is made in green and the range of green shows that the amount dislocated from $X_0$ is within the range of ±2% (the left side in the drawing shows 1.02 (+2%) and the right side shows 0.98 (−2%)), which shows that print quality can be guaranteed when adjustment is carried out within the range. Y in the indicator 132 shows the range between 3% and 2% (−3% to −2% and +2% to +3%) in an absolute value in yellow and this range indicates that caution must be taken of the maintenance of the print quality. R in the indicator 132 shows the range equal to or larger than 3% (−3% or less and +3% or larger) in an absolute value in red and this indicates that the range is dangerous and cannot guarantee the print quality.

A cursor 134 below the indicator 132 shows the value of X determined in the formula (3) to the indicator 132 in real time as far as possible and is movable in the X-direction by the positional adjustment of the light source 30. Two arrows below the cursor 134 show the directions in which the cursor 134 moves when the light source 30 is moved rightward or leftward by rotating the drive screw shaft 94 of the light source moving unit 16 clockwise or counterclockwise by the hexagon wrench inserted into the round hole 99 of the exterior cover 11 on the right side surface thereof.

A strip-shaped indicator 136 in a Y-(vertical) direction on the left side in FIG. 10 shows a dislocated amount from the registered ratio $Y_0$ which was determined and registered when the initial light source position was registered and has the same function as that of the indicator 132. Further, a cursor 138 on the left side of the indicator 136 shows the value of Y determined in the formula (3) to the indicator 136 in real time as far as possible and is movable in the Y-direction by the positional adjustment of the light source 30. Two arrows on the left side of the cursor 138 show the directions in which the cursor 138 moves when the light source 30 is moved to the operator side or the inner side by rotating the drive screw shaft 97 of the light source moving unit 16 clockwise or counterclockwise by the hexagon wrench inserted into the round hole 98 of the exterior cover 11 on the front surface thereof.

As described above, the user or the operator adjusts the position of the cursor 134 or the cursor 138 so that it is located within the range shown by the green of the indicator 132 or the indicator 136 and preferably at the center of the range as far as possible in such a manner that he rotates the drive screw shaft 97 or 94 of the light source moving unit 16 clockwise or counterclockwise by the hexagon wrench engaged with the hexagon hole of the drive screw shaft 97 or 94 through the round hole 99 on the right side surface of the exterior cover 11 or the round hole 98 on the front side thereof from the outside of the exterior cover 11 while observing the display screen 130 of the display 75 to thereby move the cursor 134 or 138 displayed on the display 75 in the X-direction or the Y-direction, respectively.

In the present invention, since the balanced state of the quantity of light of the light source can be displayed on the display screen of the display 75 as shown in FIG. 10, the operator can easily confirm positions to be adjusted (whether the front surface or the right side surface), directions in which the adjustment is to be executed (clockwise or counterclockwise) and the completion of adjustment (the indicators 132, 136 are located within the green range).

As described above, when the cursors 134 and 138 are adjusted to be located within the green ranges of the indicators 132, 136, respectively as shown in FIG. 10, the positional adjustment of the light source 30 is finished by removing the hexagon wrench from the round hole 98 or 99, so that the center of the light source 30 can be adjusted to an optimum position at the center of the film original plane (the light receiving surface of the image sensor 26) without depending upon the irregular sensitivity caused by the positions of the image sensor 26.

Thereafter, shading correction is automatically carried out in a manner similar to the time when the initial light source position was registered to thereby correct the shading of the light source 30 and the image sensor 26. As a result, uniform output values can be obtained from the entire effective pixel area of the image sensor 26.

After the completion of the job, the light source position adjusting mode is finished and thereafter the controller 12 returns the image input apparatus 10 to the ordinary image reading mode to permit the execution of the aforesaid ordinary image reading job.

Since the light source position adjusting method of the present invention is essentially arranged as described above, the operator and the user can very easily and correctly adjust the position of the light source. However, the initial light source position must be very accurately registered as the premise of the accurate adjustment of the light source position. For this purpose, it is preferable in the present invention to permit the registration of the initial light source position only to a service engineer (SE) or an engineer of higher rank and prevent the operator and the user from performing the registration job, by which the possibility of the incorrect registration of the initial light source position performed by the inexpert operator and user by mistake can be precluded.

The default conditions of the light source section 20 and the imaging unit 24 in the aforesaid initial light source position registering mode and light source position adjusting mode are not limited to the above examples and any conditions may be employed so long as they are preferable to the positional adjustment of the light source. Although the measuring points where the balance of the quantity of light is registered and adjusted are the three points $P_1$, $P_2$, $P_3$ in the aforesaid example, it is apparent that the present invention is not limited to the three points and the four measuring points including the measuring point $P_4$ added to the above points or more than the four points may be used. Further, the method of displaying on the display 75 is not limited to the illustrated example and any method may be used so long as it can display the result of adjustment in an interactive fashion in real time.

Although the light source 30 is adjusted in the θ-direction using the rod-shaped member 86f while visually observing the light source 30 by opening the exterior cover 11 without putting on the light source 30, it may be adjusted from the outside of the exterior cover 11 while putting on the light source 30.

Although the light source position adjusting method of the present invention has been described above in detail, the present invention is by no means limited to the above embodiment and it goes without saying that various improvements and modifications can be made in the range which does not depart from the gist of the present invention.

As described above in detail, according to the present invention, even if the position of the light source is varied by the replacement and the like of it, the position of the light source can be easily, correctly and safely adjusted from the outside of the exterior cover in the state that the light source is put on. Further, according to the present invention, even if an image sensor having irregular sensitivity depending upon its positions is used, since an initial light source position is correctly registered using the dedicated tool, the position of the light source can be correctly and easily adjusted with reliability from the outside of the exterior cover without depending upon the irregular sensitivity of the image sensor by using the output data measured by the image sensor through the lens unit while putting on the light source and observing the result of measurement displayed on the monitor. As a result, the shading correction of the light source and the image sensor can be correctly performed. Therefore, according to the present invention, a print image of high quality can be obtained on a thus obtained print without causing the inclination of colors and the like due to the insufficient adjustment of the light source position.

What is claimed is:

1. A light source position adjusting method for externally adjusting position of a light source of an apparatus for imaging photographic film, comprising the steps of:

adjusting a position of the light source while the light source is emitting light by externally manually operating a light source moving device, so that quantities of light are uniformly balanced at a plurality of predetermined points on a plane of the photographic film;

determining an average value of output light at pixel regions of an image sensor, corresponding to the plurality of predetermined points on the plane of the photographic film;

displaying the determined averaged values of the respective pixel regions of the image sensor corresponding to the plurality of predetermined points, and output values of the adjusted light source; and further adjusting the position of the light source by externally manually operating the light source moving device while observing the displayed values so that the values of the light output from the respective pixel regions move closer to the averaged output values.

2. A light source position adjusting method according to claim 1, wherein the plurality of predetermined points include at least three points in the vicinity of four corners of the plane of the photographic film with respect to a center thereof.

3. A light source position adjusting method according to claim 2, further comprising the step of displaying permissible ranges of adjustment which permit the averaged state in a direction with respect to the film and the averaged state in a perpendicular direction to be obtained from the output values and which permits adjusting positions, adjusting directions and completion of adjustment of the light source moving device to be confirmed.

4. A light source position adjusting method according to claim 1, further comprising the step of displaying permissible ranges of adjustment which permit the averaged state in a direction with respect to the film and the averaged state in a perpendicular direction to be obtained from the output values and which permit adjusting positions, adjusting directions and completion of adjustment of the light source moving device to be confirmed.

5. The light source positioning method of claim 1, wherein position is adjusted in two dimensions.

6. The light source positioning method of claim 1, wherein position is adjusted using an external tool.

7. A light source position adjusting system for externally adjusting a position of a light source of an imaging apparatus, for imaging photographic film, while the light source is emitting light, comprising:

a position adjusting device, external to the light source, for manually adjusting a position of the light emitting light source so that quantities of light are uniformly balanced at a plurality of predetermined points on a plane of the photographic film;

a processor for determining an average value of output light at specific pixel regions of an image sensor of the imaging apparatus, corresponding to the plurality of the predetermined points on the plane of the photographic film; and a display for displaying the determined averaged value of output light and output values of the adjusted light source, wherein the position of the light emitting light source is further adjusted by the position adjusting device while observing the displayed values so that values of the light output from the respective pixel regions move closer to the displayed average values.

8. The light source positioning system of claim 7, wherein the plurality of predetermined points include at least three points in the vicinity of four corners of the plane of the photographic film with respect to a center thereof.

9. The light source positioning system of claim 7, wherein the display further displays permissible ranges of adjustment.

10. A position adjustment apparatus for externally adjusting a position of a light source for an imaging apparatus, for imaging a photographic film, while the light source is emitting light, comprising:

a base unit, for holding the light source;

a first driver, at least a portion of which is external to the imaging apparatus, for moving the base unit in a first direction to displace the light emitting light source in the first direction; and a second driver, at least a portion of which is external to the imaging apparatus, for moving the base unit in a second direction, perpendicular to the first direction, to displace the light emitting light source in the second direction; and a rotatable shaft connected to the light source, for rotating the light source.

11. The position adjustment apparatus of claim 10, further comprising: a rod member, connected to the rotatable shaft, for causing the rotatable shaft to rotate the light source.

12. The position adjustment apparatus of claim 10, wherein the rotatable shaft is for permitting a filament of the light source to be adjusted.

13. The position adjustment apparatus of claim 11, wherein the rod member is for causing a filament of the light source to be adjusted.

14. The position adjustment apparatus of claim 10, wherein the first and second driver are operated using an external tool.

15. The light source position adjusting method of claim 1, further comprising the step of storing the determined average values of the respective pixel regions.

16. The light source position adjusting method of claim 1, wherein the displayed output values of the adjusted light source include an averaged state of the output values.

17. The light source position adjusting system of claim 9, further comprising a memory for storing the determined average values.

* * * * *